Nov. 23, 1937.  E. A. LINK, JR  2,099,857
TRAINER FOR AVIATORS
Filed Aug. 14, 1936  11 Sheets-Sheet 1

INVENTOR.
EDWIN A. LINK, JR.
BY
ATTORNEY.

Nov. 23, 1937.  E. A. LINK, JR  2,099,857
TRAINER FOR AVIATORS
Filed Aug. 14, 1936    11 Sheets—Sheet 2

INVENTOR.
EDWIN A. LINK, JR.
BY
ATTORNEY.

Nov. 23, 1937.  E. A. LINK, JR  2,099,857
TRAINER FOR AVIATORS
Filed Aug. 14, 1936  11 Sheets-Sheet 6

INVENTOR.
EDWIN A. LINK, JR.
BY
ATTORNEY.

Nov. 23, 1937.  E. A. LINK, JR  2,099,857
TRAINER FOR AVIATORS
Filed Aug. 14, 1936   11 Sheets-Sheet 7
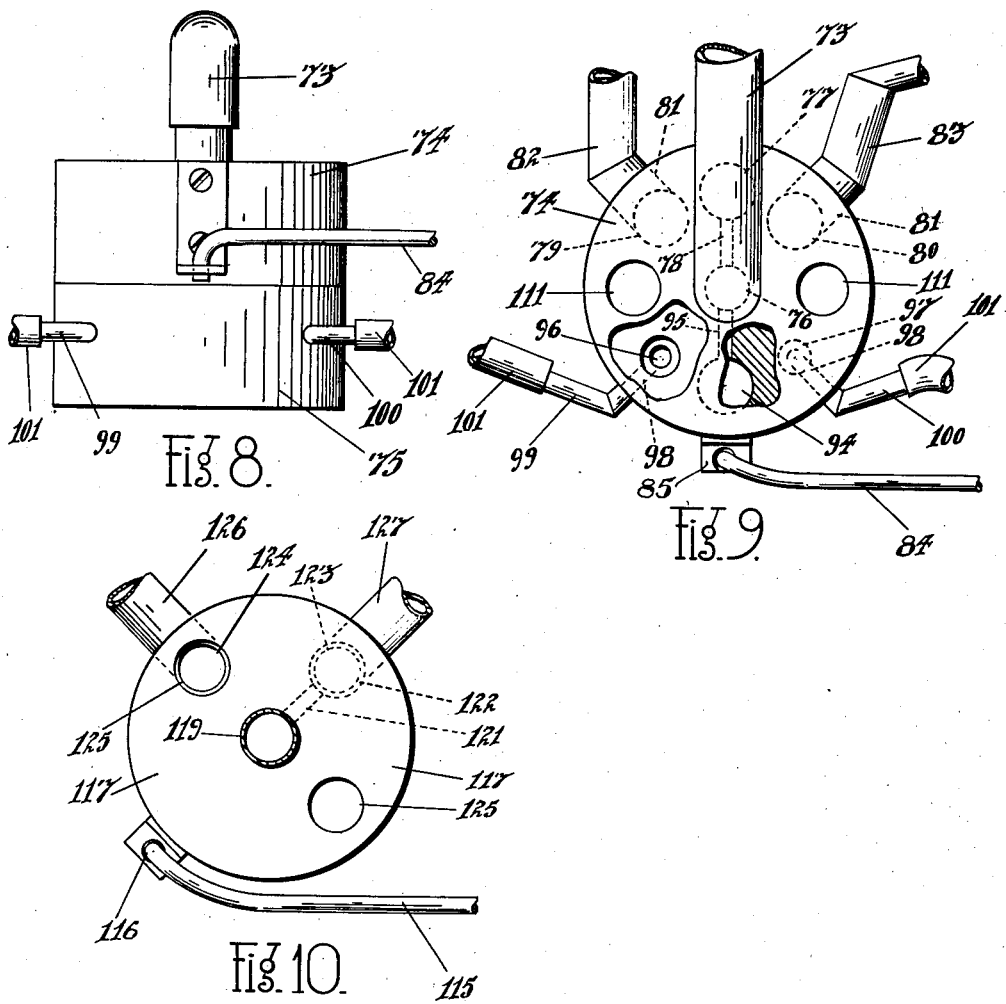
INVENTOR.
EDWIN A LINK, JR.
BY
Philip S. Hopkins
ATTORNEY.

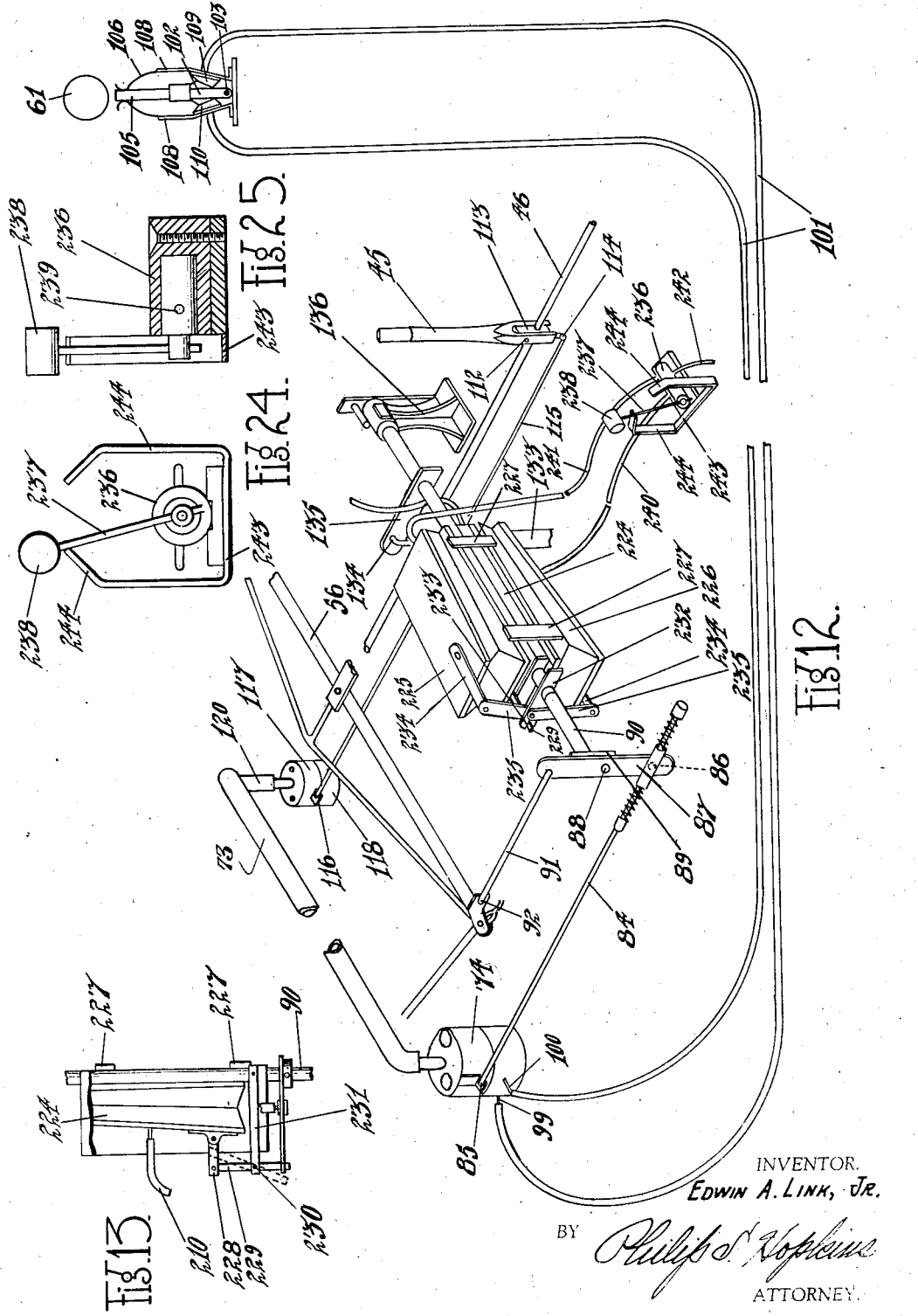

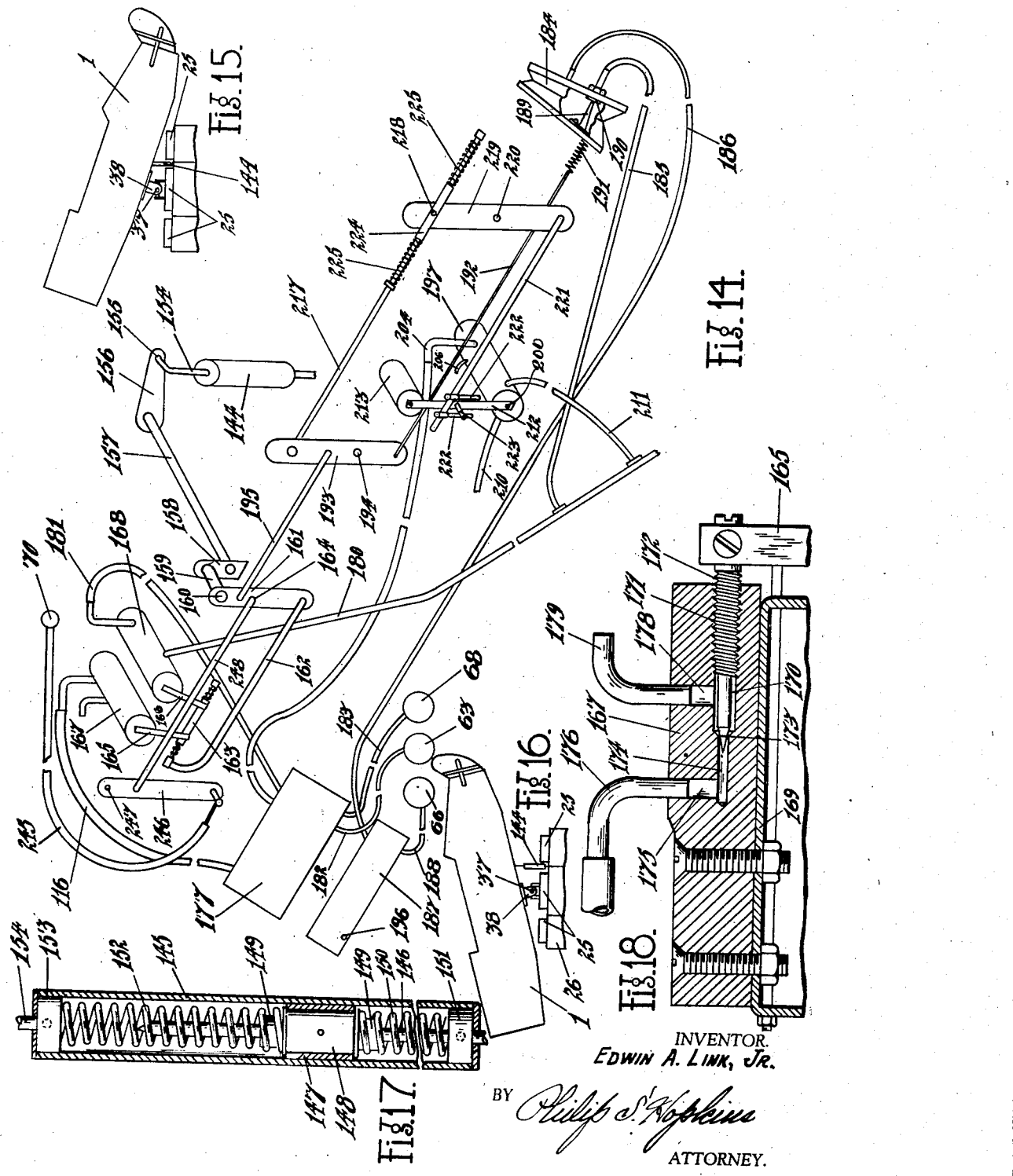

Nov. 23, 1937.  E. A. LINK, JR  2,099,857
TRAINER FOR AVIATORS
Filed Aug. 14, 1936  11 Sheets-Sheet 11
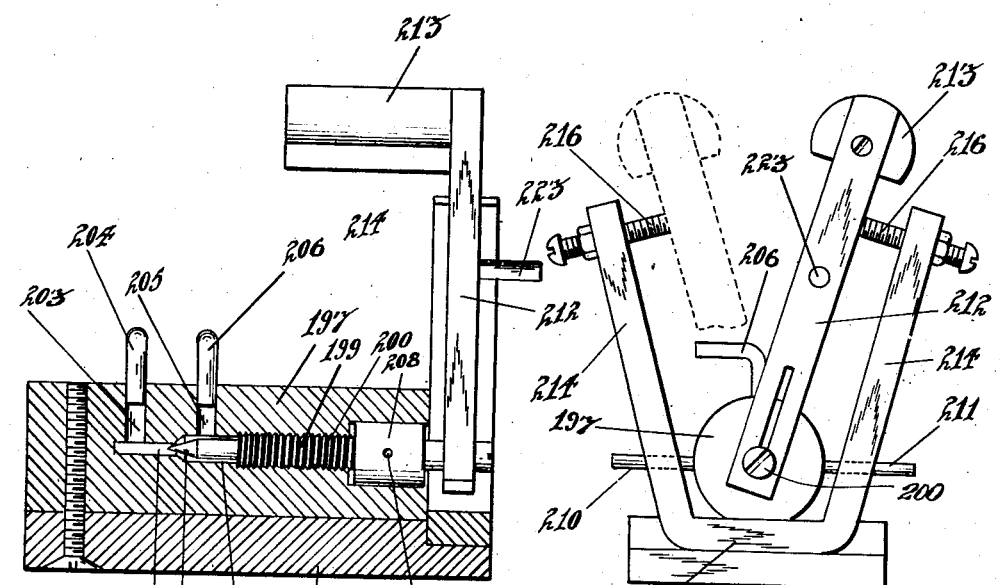
Fig. 23.  Fig. 22.
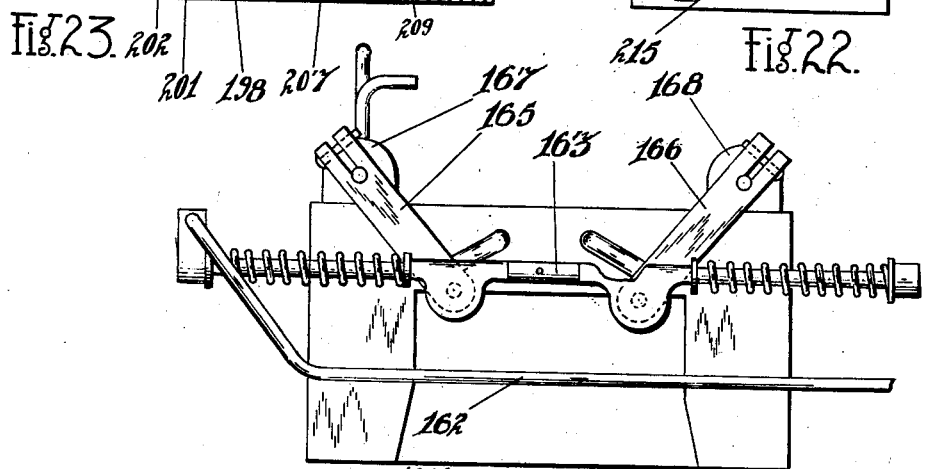
Fig. 19.
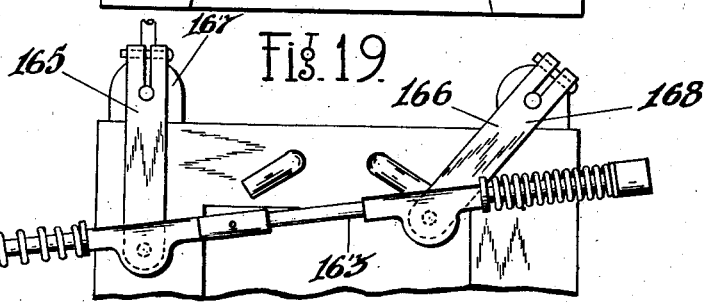
Fig. 20.
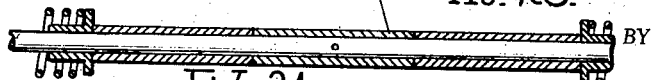
Fig. 21.
INVENTOR.
EDWIN A. LINK, JR.
BY
ATTORNEY.

Patented Nov. 23, 1937

2,099,857

UNITED STATES PATENT OFFICE 2,099,857

TRAINER FOR AVIATORS

Edwin A. Link, Jr., Binghamton, N. Y.

Application August 14, 1936, Serial No. 96,033

36 Claims. (Cl. 35—12)

My invention relates to trainers for aviators and is an improvement upon my prior Patent Number 1,825,462 issued September 29, 1931.

In the art of training pilots, particularly for flying by instrument, I have found it possible to provide in a trainer, which essentially constitutes a miniature aeroplane mounted upon a universal support whereby the trainer can be rotated, tilted, and tipped in all normal flying positions of an aeroplane, means whereby the response of the trainer and of the essential instruments can be simulated exactly in accordance with the actual response thereof in an aeroplane in flight. This makes it possible for the training of pilots in instrument flying without hazard in all kinds of weather and at a very much reduced cost as compared with the same type of instruction if given in actual flight.

One of the principal objects of my invention is to provide an improved training device of this type wherein the pilot is placed under conditions simulating exactly those of an aeroplane in actual flight, and is provided with means whereby he can control and correct the position and performance of the trainer in the same manner as if in actual flight.

One important feature of my invention lies in the provision of a throttle control and assembly in the trainer by means of which the instruments responsive to throttle control in an aeroplane and responsive to motor operation in an aeroplane, function in like manner in the trainer and under the influence of the throttle assembly unit.

A second important feature of my invention lies in the provision of means for causing the instruments registering air speed, vertical speed, and in addition, the sensitive altimeter to function in the trainer in a manner exactly simulating these same instruments in an aeroplane in flight.

Another important feature of my invention comprises a means for deflecting the compass in the trainer in a manner to simulate actual compass performance in an aeroplane under all conditions of flight.

Still another important object and feature of my invention lies in the provision of means for causing the trainer to spin under certain circumstances of operation corresponding to similar circumstances and conditions if imposed upon a plane in actual flight. This means is also interrelated with the appropriate instruments on the trainer so that they perform, as a result of the spin, exactly as do the instruments of a plane under similar conditions.

Still another object of my invention lies in the provision of a motor driven mechanism for causing the trainer to assume various positions and angles corresponding to the effect of rough air on a plane in actual flight.

A further object of my invention lies in the provision of means for causing the turning of the trainer when one wing thereof is low, in simulation of an aeroplane in flight under like conditions.

Other objects and advantages will be apparent as the description proceeds, reference now being had to the figures of the accompanying drawings forming a part of this application and wherein like reference numerals indicate like parts.

In the drawings:

Figure 8 is a detail side view of one of the control valves.

Figure 9 is a top plan view thereof, certain parts being broken away for clearness of illustration.

Figure 10 is a top plan view illustrating another of the control valves.

Figure 12 is a diagrammatic perspective view illustrating the rudder control assembly and its connections to the various parts operated thereby.

Figure 13 is a detail side view of the spin trip bellows.

Figure 14 is a perspective diagrammatic view of the instrument valve control assembly.

Figure 15 is a detail side view of the trainer in one position of control.

Figure 16 is a side view of the trainer in another position of control.

Figure 17 is a detail sectional view of the compensating connection between the trainer and its support for the operation of the control valves.

Figure 18 is a detail sectional view of one of the control valves.

Figure 19 is a side view of one of the instrument control valves.

Figure 20 is a fragmentary view similar to Figure 19 showing the parts in a different position of operation.

Figure 21 is a detail sectional view illustrating the instrument valve push rod.

Figure 22 is a front view of the stall and spin trip valve.

Figure 23 is a cross sectional side view of the stall and spin trip valve.

Figure 24 is an end view of the operating means for the spin trip valve.

Figure 25 is a sectional view thereof.

Figure 1:
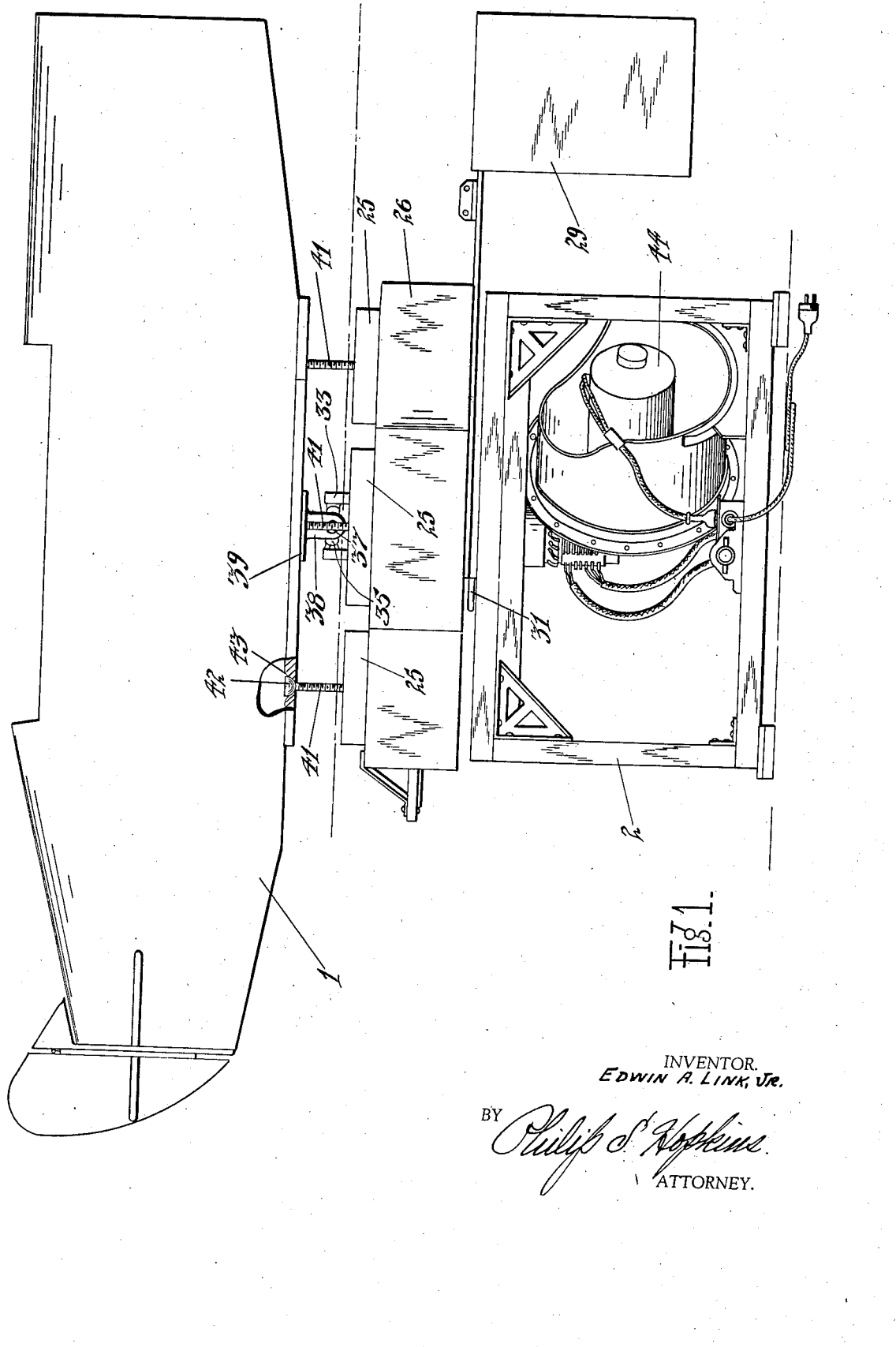
Figure 1 is a side view of my improved trainer in assembled condition.

It should be borne in mind at the outset that this trainer is constructed to simulate as nearly as possible the actual appearance, feel, and maneuverability of an aeroplane, particularly when it is being operated under a hood, and is provided with standard aeroplane instruments, control stick, rudder, etc. so that the student pilot using the same may transfer from this trainer after receiving his course of instruction or after having had practical experience therein, to an actual plane and without confusion or strangeness, duplicate that which he has acquired by instruction and experience in the trainer. It is not a toy or plaything but is designed specifically for the purpose of teaching the art of instrument flying to already competent pilots.

The reference character 1 refers generally to the fuselage of the trainer which simulates in miniature the fuselage of an aeroplane and may be provided with the usual control surfaces and tail assembly of a plane. This trainer is supported upon a base frame 2 on the upper side of which is provided the fixed supporting cross 3 and through the center of which is secured the bearing housing 4 (see Figure 4). The bearing housing 4 is bolted as at 5 to the supporting cross 3 and carries the roller bearing rings 6 complementary to the bearing rings 7 carried by a rotatable supporting shaft 8 and between which rings are disposed the ball bearings 9. The shaft 8 is shouldered as at 10 for engagement, being shouldered to receive the bearing ring 7. These bearings are designed as thrust bearings as well as supporting bearings. The bottom of the housing 4 is flanged as at 11 to hold the outer ring 6. A cover plate 12 is provided over the top of the housing 4 and around the shaft 8. The shaft 8 is reduced in thickness as shown clearly in Figure 4, from the bearing housing downwardly and its lower end is received within a plug 13 suitably secured therein and projecting into the hollow shaft. The plug 13 is secured to the shaft 8 for rotation therewith and extending into the hollow plug 13 is a shouldered nipple 14 fixed with respect to the shaft and to which is secured one end of an air duct 15 communicating through the nipple and plug with the interior of the shaft 8. Lining the interior of the hollow shaft 8 is a hollow tubing 16 of rubber or the like through which the flow of air controlling the various operations to be described takes place.

Figure 4:
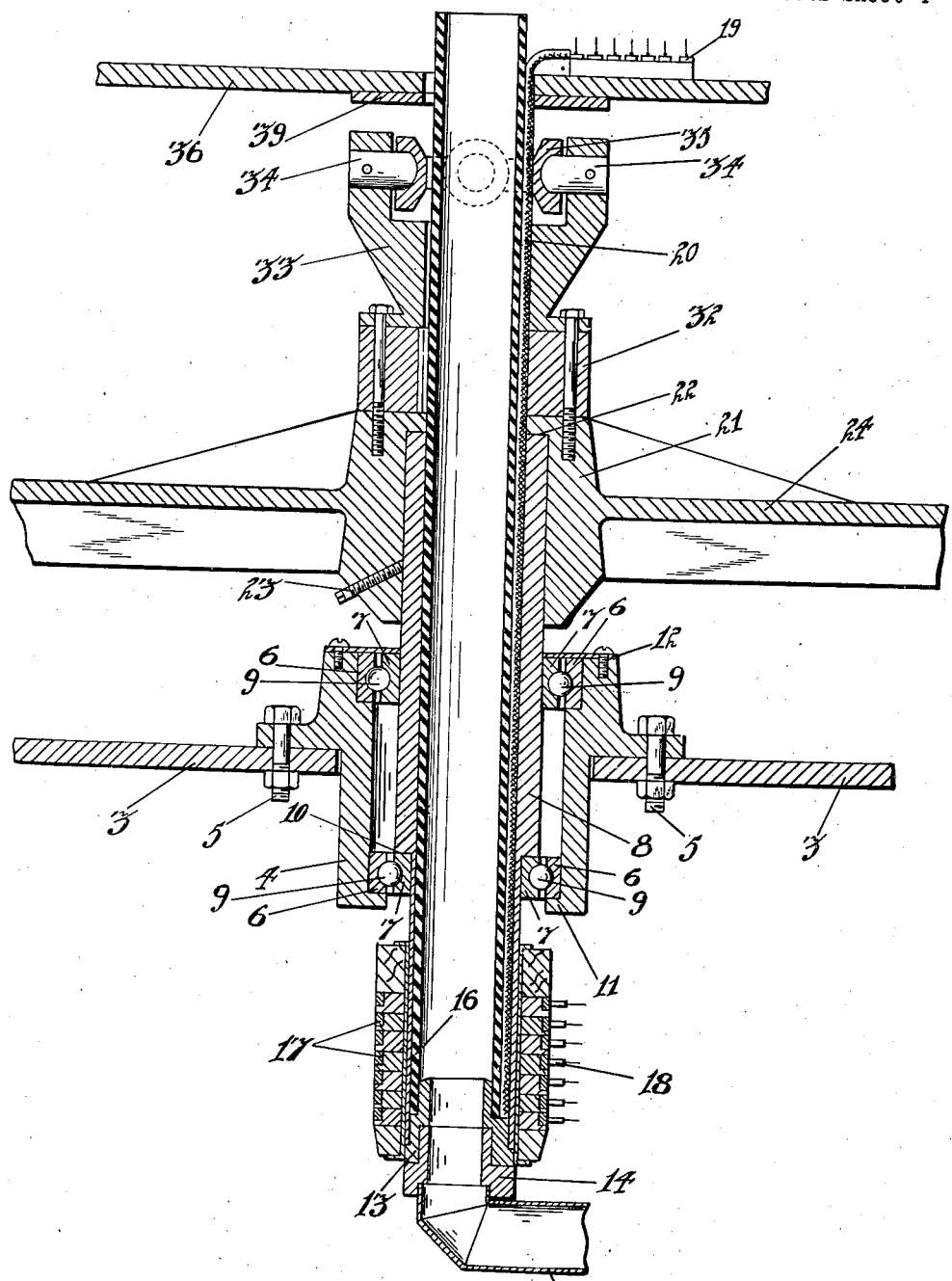
Figure 4 is a detail cross sectional view illustrating the assembly of the trainer supporting means and the main air duct therethrough for the various operating parts. This figure also illustrates the electric wiring connections for the radio equipment with which the trainer is equipped and also for the motor governing the air pump for operating the tilting bellows.

Still referring to Figure 4, the outside of the shaft 8 adjacent its lower end is provided with a plurality of electric contact rings 17 cooperating with which are fixed contact brushes 18 for a purpose to be described. Suitable electrical connection is made between the contact rings 17 and a series of stationary contacts 19 at a point within the trainer through the conductor cable 20 which passes upwardly within and through the hollow shaft 8.

Supported upon the upper end of the shaft 8 is a boss 21 shouldered at its top as at 22 to engage the top of the shaft 8. This boss is keyed to the shaft 8 for rotation therewith as by means of a set screw 23. Radiating outwardly from the boss 21 are the supporting arms 24 (see Figures 3 and 4) which rotate with the shaft 8 and which support the tilting bellows 25 for the trainer. A frame 26 connects the ends of the arms 24 to provide a housing for the bellows and to this frame at one point is secured a step 27 to facilitate getting into and out of the trainer.

Figure 2:
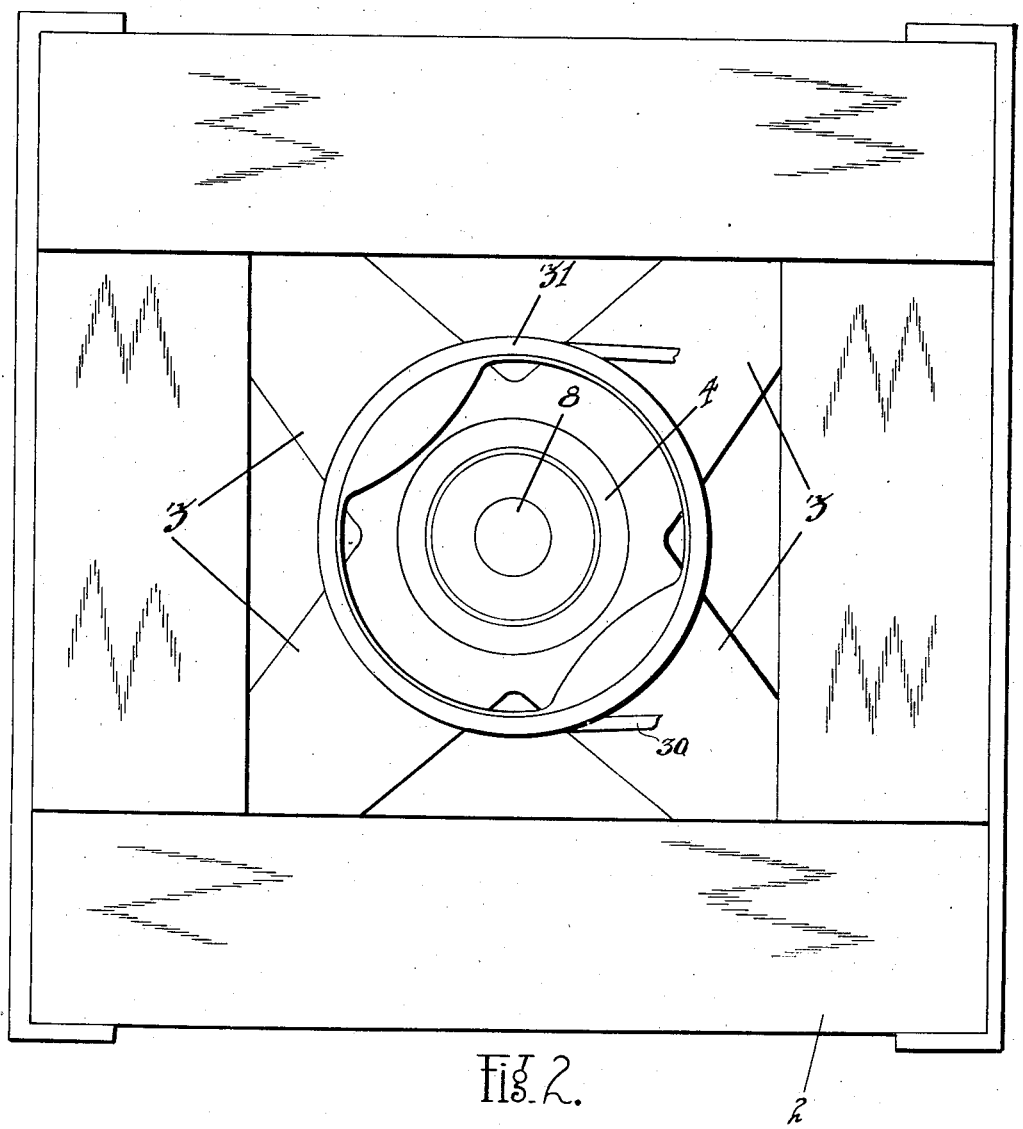
Figure 2 is a top plan view of a portion of the supporting base for the trainer.

Also supported by one of the arms 24 and braced to the frame 26 is an extension frame 28 supporting the double acting air motor 29 which serves to rotate the shaft 8 by means of a belt 30 extending from such motor around a pulley wheel 31 (see Figure 2) rigidly supported upon the top of the frame 2 and surrounding the bearing housing 4. The belt 30 running between the air motor 29 and the pulley wheel 31 is disposed between the fixed support members 3 of the frame and the rotatable arms 24.

The details of the air motor 29 (Figures 1 and 3) have not been shown as they form no part of this invention. Suffice it to say that upon admitting reduced air to one side of the motor the same rotates in one direction and upon admission of reduced air to the other side of the motor, it operates in the opposite direction. The control of this reduced air to the motor is by means of the rudder and other means in the trainer through valves and connections to be described.

Referring again to Figures 1, 3 and 4, there is suitably bolted to the upper side of the boss 21 a spacing block 32 and to the upper side of this block is secured a bifurcated supporting bracket 33 provided with aligned pintles 34 pivotally mounted upon which is a swivel 35. Both the spacing block 32 and the bifurcated supporting bracket 33 are hollow and the air tube 16 extends upwardly therethrough and through an opening in the bottom 36 of the trainer. The swivel member 35 encircles the tube 16 and is provided on opposite sides and at right angles to the pintles 34 with pintles 37 (see Figure 1). Pivotally secured to these pintles 37 are downwardly depending arms 38 carried by a bracket 39 on the underside of the bottom 36 of the trainer. It will thus be seen that the trainer is mounted for universal tilting by means of the pivot about the pintles 34 in one plane and about the pintles 37 in a plane at right angles thereto. This permits the tilting of the trainer to any desired angle as well as providing for the rotation thereof through a complete 360 degree turn together with the shaft 8.

Secured to the top side of each of the tilting bellows 25 carried by the arms 24 is a strap or plate 40 upon which is mounted an upwardly extending screw rod 41, the upper end of which passes through the bottom of the trainer and is provided with a threaded ball nut 42 seated within a socket 43 provided for each of the screw rods and by means of which the trainer may be properly adjusted with respect to the base and yet permitted to freely tilt in response to the action of the bellows 25. It will be obvious that with this connection between the upper sides of the bellows 25 and the bottom of the trainer at positions forwardly and rearwardly of the center of the trainer and on each side thereof, operation of the bellows 25 to collapse or expand will result in corresponding tilting movement of the trainer.

In Figure 1 there is shown mounted within the base frame 2 a motor driven air turbine 44 by means of which a suction force is created which communicates with the trainer through the duct 15 through the hollow shaft 8, tube 16, and the various flexible hose connections and valves within the trainer to be described.

Within the trainer fuselage there is provided a control stick 45 secured upon a shaft 46 extending longitudinally of the trainer. This stick is mounted upon the shaft 46 for free pivotal motion in a plane longitudinal with the shaft 46, but is connected so that side motion of the stick lateral to the shaft results in rotation of the shaft. The shaft 46 is supported at the front of the trainer fuselage in a suitable bearing 47. The opposite or rear end of the shaft 46 is suitably supported in bearings (not shown) and has secured to its rear end, a collar 48 extending outwardly from which is a lever 49 having pivotally connected to its end a link 50.

Suitably mounted in brackets 51 adjacent the front of the trainer is a shaft or bar 52 upon which are mounted rudder pedals 53, each of which is separately connected by cables 54 and 55 to the ends of a rudder bar 56 pivotally supported at its center as at 57 to a fixed bracket 58 carried by a brace member 59 extending across the trainer.

The operation of the stick 45 simulates exactly that of the stick of an aeroplane, as does also the operation of the rudder pedals and bar. The interior of the trainer is, of course, provided with a suitable seat conveniently arranged and from which the operator can grasp the stick and reach the rudder pedals.

In front of the pilot in the trainer is an instrument panel 60 (see Figure 6) upon which are mounted the various flight instruments such as the magnetic compass 61, the artificial horizon 62, the sensitive altimeter 63, the radio compass 64, radio marker beacon 65, air speed indicator 66, bank and turn indicator 67, vertical speed indicator 68, and gyro compass 69. Also provided on the panel 60 within easy reach of the pilot is a throttle member 70. As before stated the operation of the trainer by manipulation of the stick and rudder is such that the instruments register the result of such operation exactly the same as do the instruments of an aeroplane in actual flight.

Figure 5:
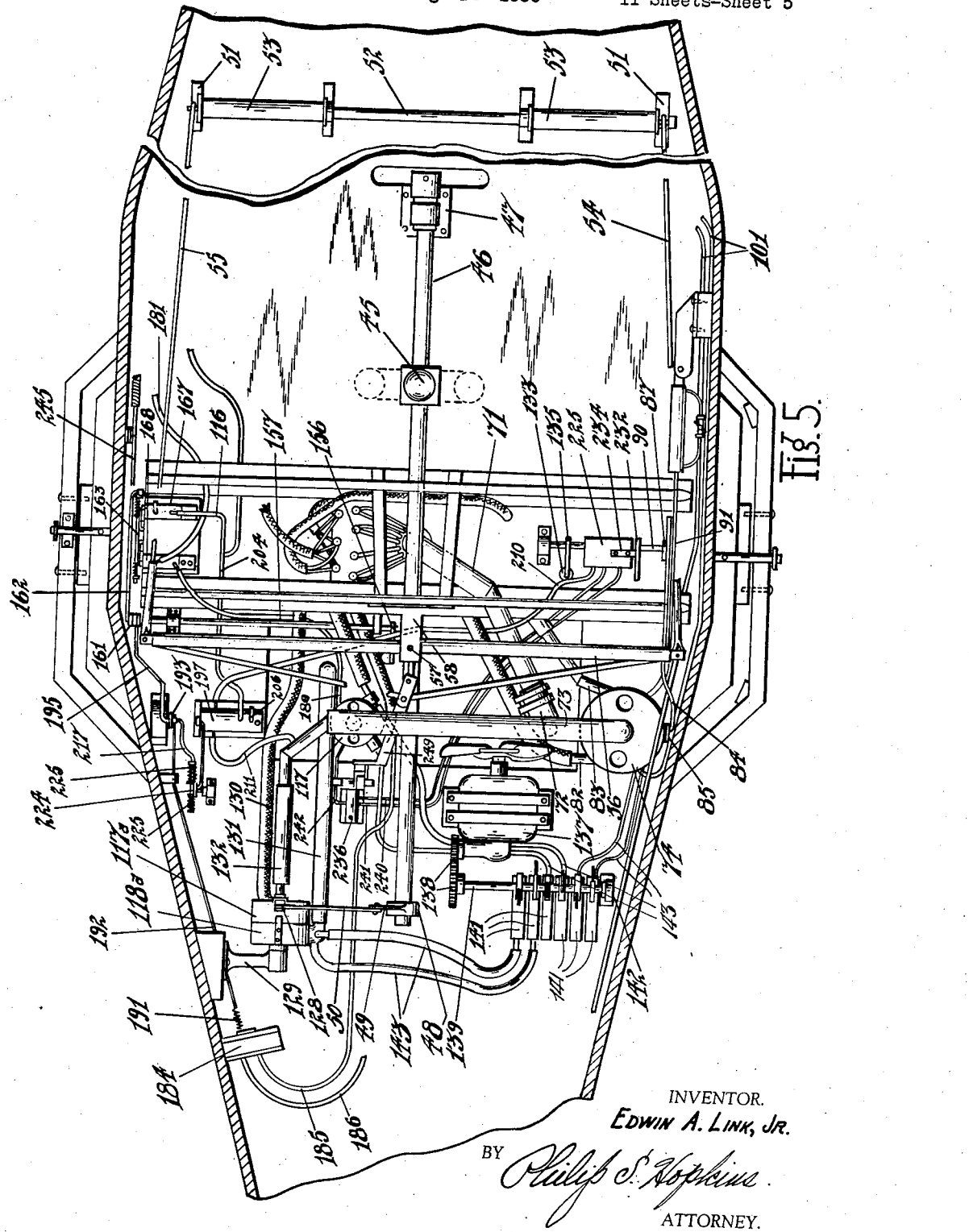
Figure 5 is a top plan sectional view showing in assembled relation within the trainer the various control valves and units for the operation of the trainer.

Referring now particularly to Figures 5 and 9, it will be observed that centrally of the trainer a pipe 71 communicates with the upper end of the tube 16 comprising the main reduced air channel or duct from the vacuum turbine. This pipe 71 communicates through a suitable connection 72 to a hollow manifold pipe 73. One end of the manifold 73 communicates with a rotatable valve member 74 cooperating with a stationary valve member 75. The end of the manifold 73 entering the top element 74 of the valve communicates with an opening 76 centrally disposed therein and extending downwardly through a substantial part of the top element 74. Spaced from this central opening 76 is an opening 77 extending from the underside of the top element 74 of the valve upwardly for a substantial distance, and connecting the openings 76 and 77 is a duct or passage 78.

Disposed in the same radial plane with the opening 77 but located in the lower fixed element 75 of the valve, are the spaced openings 79 and 80 extending from the top of such lower element downwardly a substantial distance and then having passages 81 (see Figure 9) communicating therefrom outwardly to the edge of valve member 75 and communicating with such passages are the pipe connections 82 and 83. Obviously rotation of the upper element 74 of the valve, to bring the opening 77 into registry with either one of the openings 79 or 80 will result in establishing reduced air communication between the manifold 73 and the pipes 82 or 83.

The rotation of the upper valve member 74 is caused, in one instance, by the operation of the rudder pedals 53, through the links 54 and 55 to the rudder bar 56. With reference to Figure 9 it will be observed that there is a link 84 fixedly connected at one end as at 85 to the rotatable valve element 74. This link is connected at its opposite end (see Figure 12) as at 86 to the lower end of an arm 87 pivoted as at 88 to a plate 89 carried by one end of a shaft 90. The opposite end of the arm 87 has pivotally secured thereto one end of a link 91, the opposite end of which is secured as at 92 to the rudder bar 56. Obviously therefore, pivotal movement of the rudder bar 56 will, through the parts just described, serve to rotate the valve element 74 to bring the opening 77 into registry with either the port 79 or port 80 depending upon the direction of movement of the rudder bar.

Figure 3:
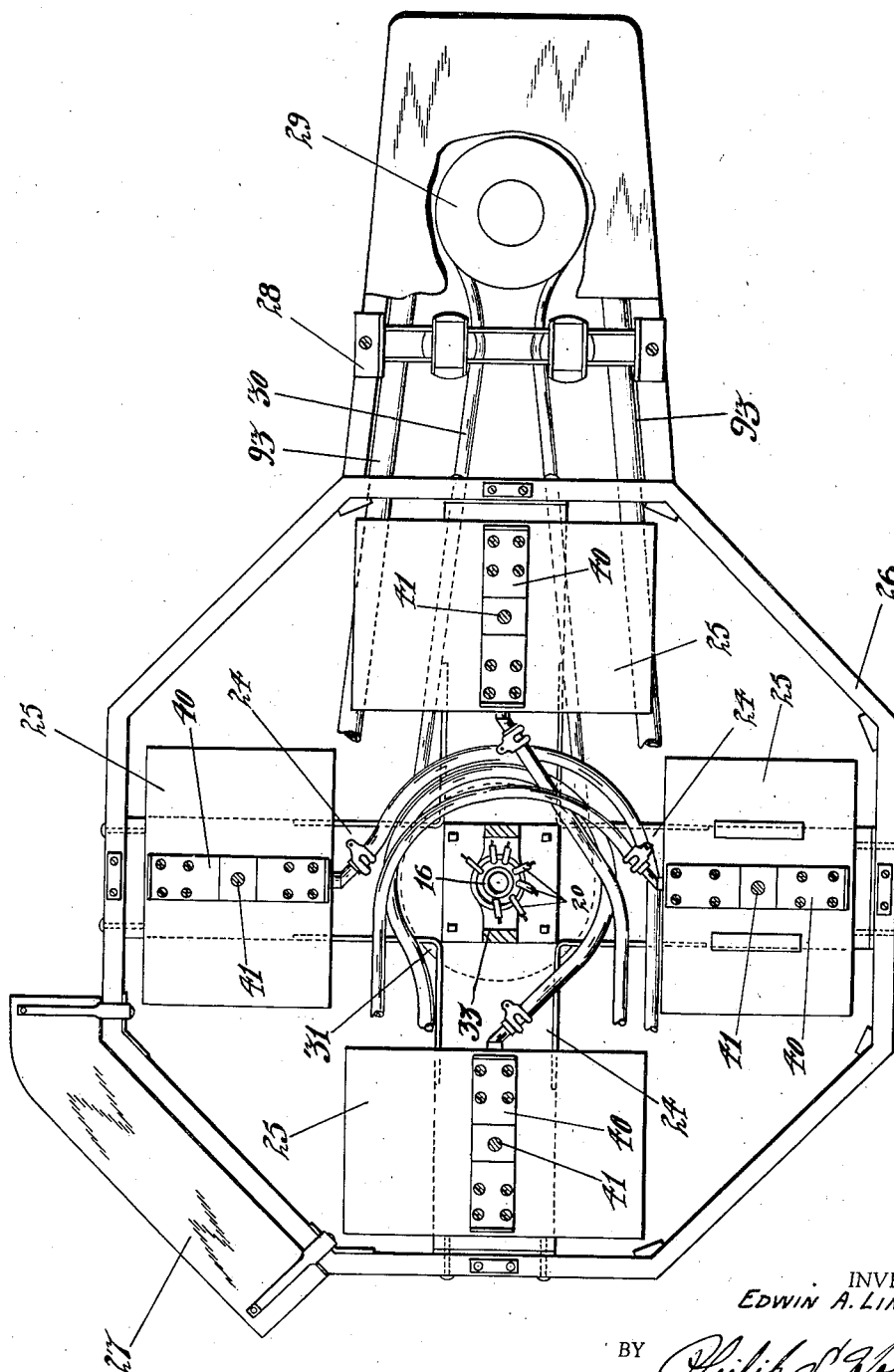
Figure 3 is a top plan view of the supporting structure for the trainer with the tilting bellows in assembled position. Also clearly shown in the figure is the turning motor for the rotatable support.

The pipe connections 82 and 83 communicate through suitable flexible hose members 93 with the turning motor 29 (see Figure 3). Therefore the operation of the rudder bar in either direction serves to operate the turning motor 29 to rotate the trainer as heretofore explained.

Again referring to Figures 5 and 9, it will be seen that in addition to the ports and openings just described, the upper rotatable valve section 74 is also provided with a second opening 94 extending from the underside of such element upwardly substantially through the same and communicating through a port 95 with the central opening 76.

The stationary bottom valve element 75 is also provided with additional spaced openings 96 and 97 extending from the upper side of such element downwardly a substantial distance and provided with lateral ducts 98 communicating with the peripheral surface of such unit and having connected thereto and in communication therewith the pipe sections 99 and 100. The same action occurs as before explained, namely, that when the upper element 74 is rotated, the opening 94 communicates with either the opening 96 or the opening 97 establishing communication between the pipes 99 or 100 and the main source of reduced air.

The pipes 99 and 100 communicate through hose members 101 with a compass deflector device, the function of which will now be described.

As is known, when an aeroplane in actual flight makes a turn, the magnetic compass generally turns inaccurately during the turn of the plane and requires a certain amount of time after the new line of flight is attained for swinging to proper indicating position again. This is due to the fact that the compass is pivotally mounted and because the magnetic influence of the nearest pole is on an angle to the compass in the plane in the air, when the plane is banked for a turn, this angle is changed and if the plane is, for instance, in the northern hemisphere and heading north and makes a turn to the right the angle of the magnetic force on the compass is changed to an extent that the compass swings slightly temporarily to the left. This is due to the fact that the compass card is damped in heavy liquid so that when the plane is first banked, the card assumes approximately the same angle until such time as it can change its position through the damping fluid. This creates the angular magnetic pull on the card during such bank.

Figure 7:
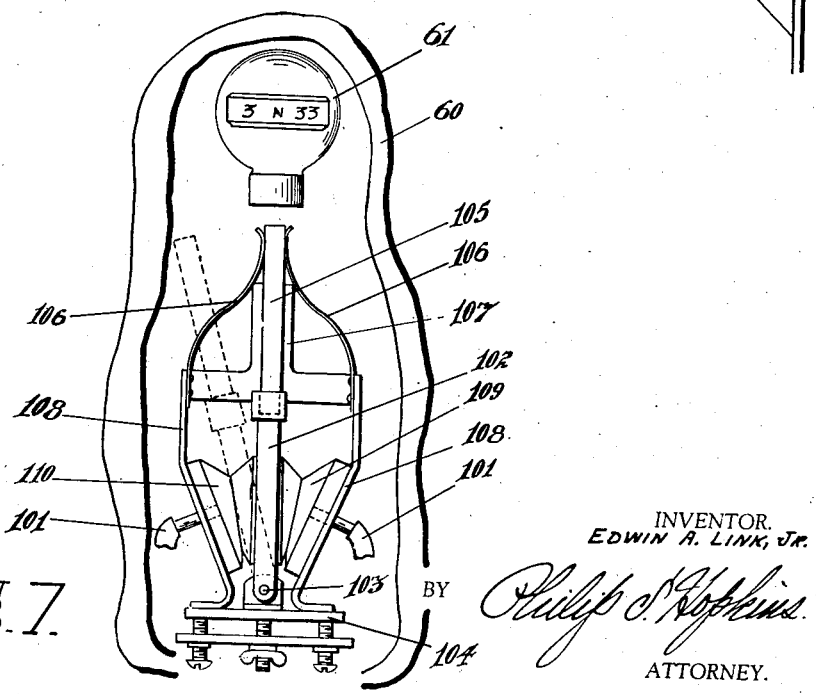
Figure 7 is a detail view of the compass deflector.

In the trainer, however, which is, of course, on the ground, the lines of magnetic force operating upon the compass are not pulling angularly as in the case of the plane in the air, and therefore, the same condition does not apply when the trainer is banked and turned. In order to simulate in the trainer this exact operation of the compass in actual flight, a compass deflector is provided which consists (see Figures 7 and 12) essentially of an arm 102 pivotally mounted as at 103 to an adjustable base 104, the upper free end of the arm 102 carrying a magnetic bar 105. This bar is normally held in vertical position by means of two leaf springs 106 applying their force against opposite sides of the bar, such springs resting intermediate their ends against a fixed stop member 107. A frame member 108 supports the springs 106 and also the stop member 107. Secured to the frame 108 are oppositely disposed bellows 109 and 110, the free sides of which are secured to the arm 102. The two hose members 101 from the valve member 75, communicate with the bellows 109 and 110.

This compass deflector is positioned in the trainer directly beneath the magnetic compass 61 and normally the influence of the magnet on the compass is neutral. The adjustable base 104 makes possible the fine adjustment of the magnetic bar 105 to the exact center of the compass so as to neutralize its influence under normal conditions.

It will be clear now that upon operation of the rudder and rotation of the valve element 74 to turn the trainer in either direction, the opening 94 (see Figure 9) will uncover either the opening 96 or the opening 97, depending upon the direction of turn, establishing reduced air communication between the main channel and through one of the hose connections 101 to one of the bellows 109 or 110, causing the same to collapse and pulling the magnetic bar 105 laterally with respect to the compass whereby to influence the compass in exactly the same manner as the same is influenced by the angle lines of magnetic force acting on a plane in actual flight as previously described.

Referring again to Figure 9, it will be observed that the top rotatable valve element 74 is provided with two oppositely disposed openings 111 extending completely through the movable element 74 and communicating at the top with the atmosphere. The purpose of these openings is to permit entry of atmospheric pressure into the opening or duct opposite that through which reduced air communication is being established. For instance, if the valve member 74 is turned to the left in Figure 9 to bring the opening 77 into registry with the opening 79 whereby to rotate the air motor and trainer in one direction, simultaneously the right hand opening 111 will register with the opening 81 admitting atmospheric pressure to such opening and through the line 83 thereof to render more effective and more immediate the reduced air force or vacuum effect through the opening 79 and line 82.

Figure 6:
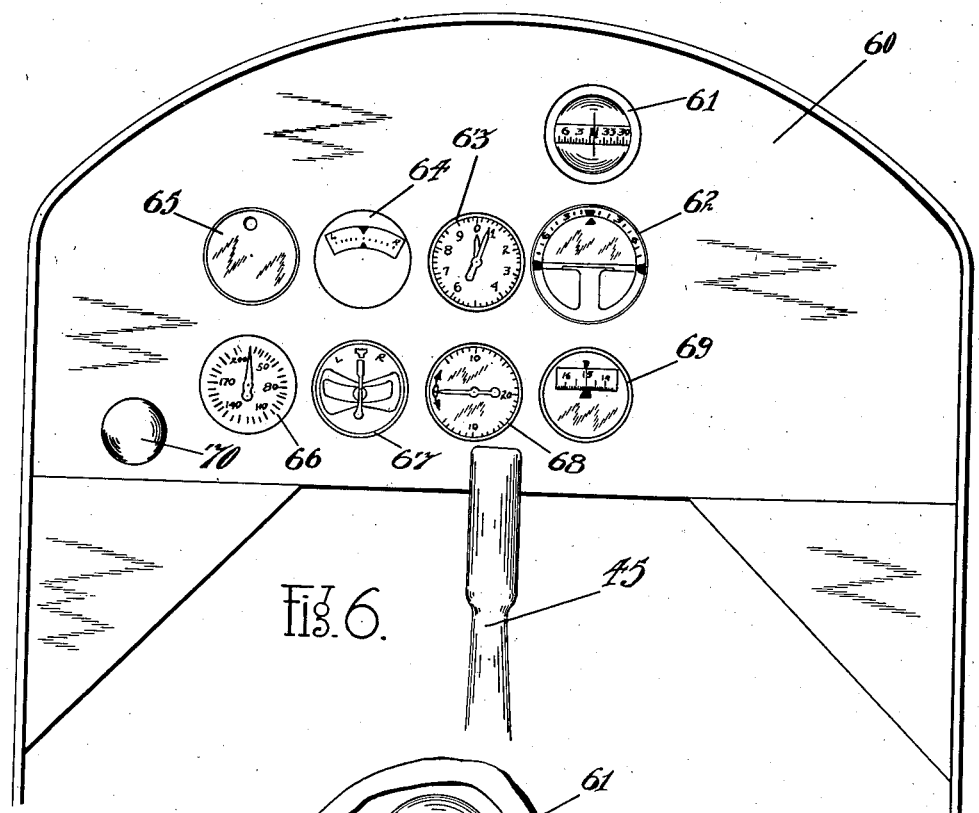
Figure 6 is a front view of the instrument board or panel of the trainer.

Referring now to Figures 6, 15 and 16, the operation of the trainer will be described as a result of the pivotal movement of the control stick 45 forwardly or rearwardly simulating the diving and climbing control of a plane in flight. With reference to Figure 12 it will be observed that the stick 45 is pivotally mounted intermediate its ends as at 112 to a block 113 rigid with the shaft 46. The lower extending end of the stick 45 has pivotally secured thereto as at 114 one end of a link 115, the opposite end of which is secured as at 116 to the upper rotatable portion 117 of a valve such as is shown in Figure 10, the bottom portion 118 of the valve being fixed. Obviously therefore, movement of the stick forwardly or rearwardly in a direction longitudinal of the shaft 46 will result in rotating the valve part 117 in one direction or the other. The upper valve part 117 is provided centrally with an opening 119 communicating through a pipe section 120 (see Figure 12) with the reduced air manifold 73. A duct 121 leads from the central opening 119 of the valve to an opening 122 near the peripheral edge of the upper part of the valve. The bottom or fixed part 118 of this valve is provided with two spaced openings 123 and 124 with which the opening 122 is adapted to be selectively registered depending upon the direction of rotation of the top part of the valve. The top valve portion 117 is also provided with two oppositely disposed openings 125 extending entirely through the upper portion of the valve and communicating on top with the atmosphere. Obviously, and as shown in Figure 10, when the valve is turned to bring the opening 122 into registry with the opening 123, the opening 125 in the top of the valve coincides with opening 124 admitting atmospheric pressure to the opening 124.

Figure 11:
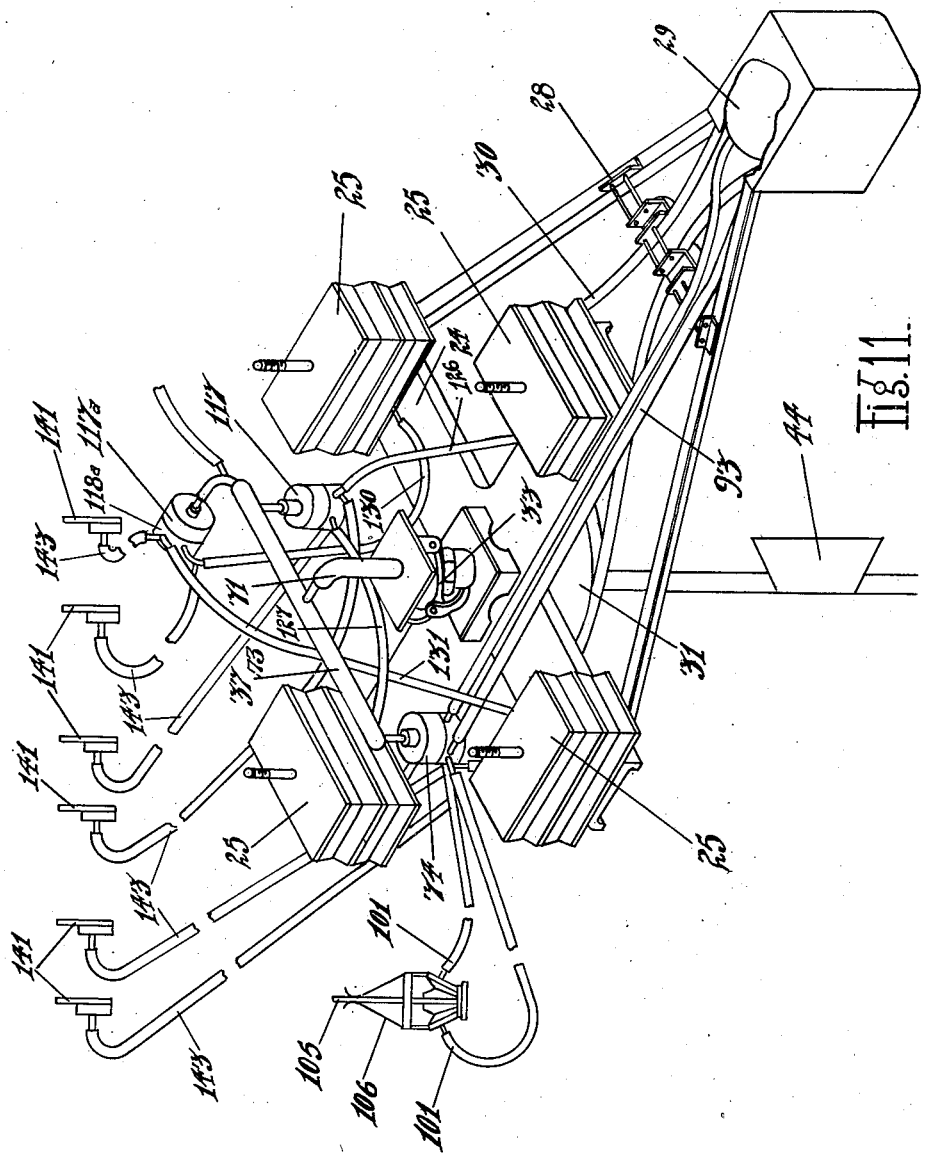
Figure 11 is a perspective diagrammatic view illustrating the general air system and connections with the various bellows units together with the controlling valves therefor.

Communicating with the opening 124 is a pipe or hose line 126 and communicating with the opening 122 is a pipe or hose line 127, the former communicating with the forward bellows 25 and the latter communicating with the rearward bellows 25 disposed in longitudinal alignment with the fuselage of the trainer. (See Figure 11.) Obviously if the stick is pushed forward a vacuum is admitted to the forward bellows 25 serving to collapse the same and causing the trainer to tilt its nose downwardly. If the stick is pulled rearwardly from central position, vacuum is admitted to the rearward bellows 25 causing it to collapse and causing the trainer to tilt its nose upwardly, in simulation of the action of an aeroplane in response to similar movements of the regular control stick. It will be understood, of course, that the particular design of the valve herein described is a matter of wide selection and choice and the particular arrangement of the ports of such valves is made in accordance with the desired timing and speed of reaction of the various bellows connected thereto with regard to the sensitiveness of the control of the trainer. In other words, the size of the opening, the particular location thereof in relation to each other, and the speed of covering and uncovering the same is a matter of predetermined choice and regulation.

In order that the trainer may be caused to tilt laterally or sidewise, or to bank in exact simulation of an aeroplane in flight, the side bellows 25 are provided as previously explained on each side of the supporting arms 24. The control of these side bellows comprises the arm 49 mounted on the rear end of the shaft 46 (see Figure 5) and the link 50 pivotally attached to such arm. The opposite end of the link 50 is secured as at 128 to the movable part 117a of a valve identical in every respect with the valve 117—118 just described in connection with the forward and rearward tilting mechanism. This valve 117a has a fixed portion 118a and the entire valve is suitably rigidly supported by means of a bracket 129 secured to a fixed part of the trainer. The details of this valve are not shown separately as they are identical with the valve shown in Figure 10 and there are provided from the outlet ports of this valve, pipe or hose lines 130 and 131, the former communicating with one of the side bellows 25 and the other communicating with the other bellows 25. The source of reduced air pressure is provided for this valve through the pipe 132 communicating with the end of the main manifold 37. Obviously therefore, movement of the stick 45 to one side or the other, results in rotation of the shaft 46, this in turn, through the arm 49 and link 50, causing rotation of the valve part 117a to bring the valve ports into selective registry with the ports in the fixed part of the valve to admit the reduced air pressure to the side bellows and causing the same to collapse, thus tilting the trainer laterally to one side or the other.

As is known, in the actual operation of an aeroplane in flight, if the plane is banked either to the right or left without simultaneously operating the rudder to turn the plane, the banking of the plane automatically results in a slight turning of the plane in the direction of the bank. In order to simulate this condition in the trainer, there is provided (see Figure 12) a fixed arm 133 secured to one of the supporting arms 24 of the trainer. The lower end of this arm is swiveled and made rotatable in any suitable manner (not shown) and the upper end of the arm is pivotally connected as at 134 with one end of a short arm 135 fixed to the shaft 90 carried by the trainer through means of brackets 136 suitably mounted within the fuselage of the trainer. Obviously therefore, as the trainer is banked to one side or the other, the relative movement between the fixed arm 133 and the short arm 135 and shaft 90, due to such banking movement, causes the arm 135 to rotate the shaft 90 in one direction or the other, this resulting in causing the link 84 to actuate the rudder control valve 74 without any movement on the part of the rudder bar 56 itself by the operator and causing reduced air pressure to be admitted to one side or the other of the turning motor 29 to cause a turning of the trainer.

It will be understood, of course, that an aeroplane in actual flight through the air encounters varying types of air resistance such as head winds, tail winds, up drafts and down drafts. These are often variable and react upon the plane in a manner to cause it to lift or drop or tilt or turn in a "bumpy" manner. In order to simulate such conditions in the trainer, I have provided means whereby the various bellows 25 are automatically caused to expand by admission of atmospheric pressure thereto in an irregular and unexpected manner. This mechanism comprises (see Figures 5 and 11) an electric motor 137 suitably mounted within the trainer and a gear drive 138 from such motor to a shaft 139 upon which are a plurality of cams 140 irregularly arranged on the shaft and adapted to engage, upon rotation of the shaft, with movable valve elements 141. The shaft 139 is suitably supported in the trainer by means of brackets 142. Each valve 141 has a pipe or hose line connection 143 to one of the outlets of each of the valves 74, 117, 117a. These valves 141 when opened by the cams 140 admit atmospheric pressure through the valves and through the lines 143 and thence through the connecting hose lines between the valves 74, 117, 117a to the bellows 25 and to the turning motor 29. The admission of this atmospheric pressure is momentary only, depending upon the length of the cam engaging the movable part of the valves 141. Consequently as each valve is caused to open, it admits atmospheric pressure to the particular bellows involved causing it to expand momentarily and thus upsetting the equilibrium of the trainer and reproducing on the trainer the rough air condition previously described.

Obviously the particular type of valves 141 which may be used for this purpose is variable and any desired type may be selected. The particular form has not been shown in detail for that reason.

Obviously too, the operation of this rough air means is selective inasmuch as the motor 137 can be turned on at will. In this connection also any suitable adjustment may be provided for the supporting means for the valves 141 by which they can be disengaged entirely from the cams 140 and also by means of which the amount of opening of such valves by the cams can be controlled. Details of this adjusting mechanism are not shown.

Referring again to an aeroplane in actual flight for comparison, as the plane proceeds in flight the usual air speed indicator registers on that instrument the air speed of the plane. Likewise as the plane dives or climbs the vertical speed indicator registers showing ascent or descent. Likewise, the altimeter registers the fact of climb or descent.

Likewise, the air speed indicator, with a constant throttle setting, shows an increase when the plane is descending and a decrease when the plane is climbing. Similarly the altimeter registers such descent and ascent. In addition the air speed indicator registers a reduction in air speed when the plane is climbing and an increase in speed when the plane is diving.

Furthermore, the operation of these instruments, particularly the air speed and vertical speed indicators, is responsive to the operation of the throttle and motor on the plane, that is, an increase in speed of the motor is registered on the air speed indicator and the vertical speed indicator in accordance with the position of the plane.

In order to bring about a similar operation of these three instruments in the trainer responsive to the position of the trainer and responsive to the operation of the throttle 70 in the trainer, I have provided the following mechanism.

First, with respect to the registry of the instruments in response to the position of the trainer, it will be observed from Figures 14, 15 and 16 that there is provided on the fixed rotatable support of the trainer and in the longitudinal plane thereof an upstanding arm 144 swiveled at its lower end to the rigid support and pivotally connected at its upper end with the bottom of the trainer. This arm is shown in detail in Figure 17 and is in the form of a cylinder 145 within which is slidably disposed a rod 146 projecting through the bottom of the cylinder and has suitable swivel connection with the rotatable trainer support. Disposed within the casing 145 is a sleeve 147 secured rigidly therein. The rod 146 passes through this sleeve and carries within the sleeve a piston 148 slidable with the rod through the sleeve 147. At either end of the sleeve there is provided a bushing 149 loosely mounted around the rod 146 of a size to engage the ends of the sleeve and not pass thereinto. A coil spring 150 encircles the rod 146 below the sleeve 147 extending between a collar 151 on the rod 146 and the underside of the sleeve 147. A second coil spring 152 encircles the rod 146 above the sleeve 147 and engages at its upper end against a collar 153 secured to a pin 154 connected at its upper end with the trainer. The lower end of the coil spring 152 engages against the upper end of the sleeve 147. The rod 146 terminates about midway between the upper end of the sleeve 147 and the upper end of the casing 145.

Obviously if the trainer assumes the climbing position shown in Figure 15, the rod 146 together with the collar 151 will slide upwardly through the sleeve 147 compressing the spring 150. If the movement of the trainer to this climbing position is extreme, the piston 148 within the sleeve will slide upwardly through the sleeve compressing the spring 152 through the medium of the slidable bushing 149 and thus take up any shock occasioned by a violent movement of the trainer to this position.

If, on the other hand, the trainer assumes the descent position shown in Figure 16, the rod 146 is pulled downwardly within the casing 145 and the piston 148 slightly downwardly through the sleeve 147 compressing the spring 150. Again if this movement is extreme the shock is taken by the coil spring 150.

Assuming that the trainer is in a climbing position of any determined amount between level flight position and that shown in Figure 15, the result is that the rod 154 of the arm 144 moves upwardly and through its connection at 155 with an arm 156 secured at its opposite end to a shaft 157 will cause such shaft to turn to the left in Figure 14. Secured to this shaft 157 at its opposite end is an arm 158 carrying a stub shaft 159 having pivotally mounted thereon as at 160 one end of an arm 161. The opposite end of this arm has connected thereto one end of a link 162, the opposite end of which is secured to an operating rod indicated generally in Figure 14 at 163, the details of which will be described hereafter.

Continuing the description of the function of these parts with the trainer in the position shown in Figure 15, rotation of the shaft 157 to the left in Figure 14 will cause the movement to the left of the pintle 159 and cause the arm 161 to rock about the point 164 (hereinafter described) resulting in pulling the link 162 to the right and moving the operating rod 163 to the right. The operating rod 163 has operative connection with two valve operating arms 165 and 166, the former actuating a "diving" valve 167, the latter operating a "climbing" valve 168. Valve 167 comprises a block suitably mounted upon a bracket 169 and is provided with an opening 170, the outer end of which is threaded as at 171 to receive a threaded needle valve stem 172 carried by the end of the operating arm 165. This threaded valve stem is provided at its inner end with a needle valve portion 173, cooperating with a reduced portion 174 of the valve opening. This reduced portion communicates with a transverse duct 175 with which is connected a pipe or hose line 176 connected to an equalizing tank 177. The valve opening 170 is also provided with a transverse duct 178 with which communicates a short pipe 179 communicating directly with the atmosphere. The threaded valve stem 172 is a lefthand thread and it will be clear that when the operating arm 165 is moved to the right or left as indicated in Figure 14, the valve stem will be rotated to move the needle valve into or out of closing position with respect to the suction channels 175 and 176.

The "climb" valve 168 is identical in every respect with the valve 167 just described and the valve shown in Figure 23 is intended to show the detail of both of these valves. In other words, the "climb" valve 168 also has a screw threaded needle valve therein operated by the arm 166, except in this case the screw valve stem is a right hand thread instead of a left hand thread. Communicating with the valve opening in the valve 168 is a pipe line connection 180 connected at its opposite end with the main vacuum manifold 37 (see Figure 5). The valve 168 also has a communicating pipe and hose line 181 directly to the equalizer tank 177.

Continuing now the functional description with the trainer in its climbing position, we have seen that the valve operating rod 163 is moved to the right in Figure 14. This results in turning the needle valve 172 in the valve 167 to closed position, thereby closing communication from such valve with respect to the equalizer tank 177. The same movement of the rod 163 serves to open the needle valve in valve 168 thereby establishing suction communication through the valve and through the line 181 into the tank 177. It should be stated here that communicating with the tank 177 by means of a hose line 182 is the altimeter 63. Also communicating with the tank 177 through a hose line 183 is the vertical speed indicator 68. Obviously therefore, with suction established through the valve 168 to the tank 177 and the altimeter and vertical speed indicators, because of the climbing position of the trainer, the suction force acting upon these two indicators will result in their registering climb and rate of climb (insofar as the vertical indicator is concerned) depending upon the amount of suction force so provided—this in turn depending upon the angle of the climbing position of the trainer.

The amount of climb will be registered on the altimeter depending upon the length of time during which the trainer is held in the climbing position. Conversely, if the trainer is tilted to descending position, shown in Figure 16, the reverse action of the valves 167 and 168 will result as follows. With the trainer in this descending position, the rod 154 will serve to rotate the arm 156 downwardly, thus rotating the shaft 157 to the right and carrying with it the pintle 159 and rocking the arm 161 about the pivot point 164, the lower end of the arm 161 now moving to the left in Figure 19 and causing the link 162 to move the operating rod 163 to the left. This movement through the arm 165 results in opening the needle valve in the "diving" valve 167 admitting atmospheric pressure through the port 178 and through the line 176 to the equalizer tank 177. Simultaneously the operating arm 166 operates the needle valve in the "climbing" valve 168 to close the communication between the suction line 180 and the tank 177. The result is that the changing air condition in the tank 177 reacts on the altimeter 63 and vertical speed indicator 68, they showing descent, and the vertical speed indicator showing a speed of descent commensurate with the amount of tilt of the trainer and the altimeter showing the amount of descent commensurate with the time the trainer is held in such position.

Obviously if the trainer is maintained in level flight position, the vertical speed indicator will remain at zero due to the fact that both of the valves 167 and 168 are in closed position. The altimeter will, for the same reason, remain at whatever reading the air condition in the tank at the time level positioning of the trainer is accomplished, compelled due to the amount of suction within the tank. Any variation of the position of the trainer either up or down will instantly register on these two instruments in the manner just explained, and is proportionate to the amount of movement of the trainer.

Referring now to the means for causing the air speed indicator 66 to register in response to the position of the trainer in accordance with its climb or descent position, reference is again had to Figure 14. There is provided a bellows 184, one side of which is fixed, and communicating with this bellows is a hose line 185 connected with the hose line 180 communicating with the main suction manifold 37 and also communicating with the bellows 184 is a hose line 186 leading into a dampening tank 187 from which a hose line 188 communicates with the air speed indicator 66. The movable side of the bellows 184 carries a needle valve 189 cooperating with a valve member 190 carried by the fixed side of the bellows and communicating with the suction line 185.

The movable side of the bellows 184 is connected by a coil spring 191 to one end of a link 192, the opposite end of which is connected to the lower end of an arm 193 pivoted at 194. On the opposite side of the pivot 194 from the link 192 is a link 195 connected at its opposite end with the arm 161 at a point above the pivot point 164.

Now if the trainer is in a climbing position as shown in Figure 15, the shaft 157, as before explained, is rotated to the left causing the pintle 159 and the upper end of the arm 161 to move to the left, thus exerting a pull to the left on the link 195 rocking the arm 193 about its pivot 194 and causing the link 192 to move to the right. This releases the tension on the spring 191 and permits the bellows 184 to collapse resulting in the needle valve 189 closing the communication to the suction line. The tank 187 is provided with a small orifice 196 providing for a very slow admission of atmospheric pressure to the tank. When the bellows 184 is collapsed and the suction force to the tank 187 is closed, the atmosphere slowly entering the tank 187 through this orifice causes the air speed indicator to show a falling off due to the slow reduction in suction force acting upon such indicator.

If, on the other hand, the trainer is tilted downwardly as shown in Figure 16, the reverse action of the parts just described occurs, causing the needle valve 189 to open the communication to the suction line and through the bellows re-establishing the suction force within the tank 187 whereupon the air speed indicator responds showing an increase in air speed. The amount of increase and decrease in the showing of the air speed indicator depends upon the speed at which the valve is opened by the tilting of the trainer and upon the length of time it remains in its tilted position.

Again referring to an aeroplane in flight for comparison, it is known that if an aeroplane is climbed to such an extent that through the lack of power of the motor it reaches a point where it can no longer climb at that angle, the plane begins to lose altitude and the vertical speed indicator and the altimeter register such loss of altitude and the rate thereof. At such a point the forward speed of the plane, if the plane is held at the same climbing angle, becomes less than the vertical descent speed thereof. Also under such conditions when the forward speed of the plane reaches the stalling point, that is, the point at which the weight of the plane overcomes the forward speed and the lifting power on the plane, then the plane goes into a spin due to lack of control, this spin being characterized by the nosing downwardly of the plane and the turning thereof. I have provided in my improved trainer, means for simulating exactly these conditions and movements of a plane in actual flight and in registering on the air speed indicator, vertical speed indicator, and altimeter, the conditions just described, and in addition, bring about the actual rotation of the trainer. Furthermore by the controls provided in the trainer and previously described through the rudder and stick operations, it is possible for the student pilot to recover from a stall and spin in exactly the same manner as in an aeroplane in flight.

This means for simulating the stall and spin of a plane in the trainer comprises (referring again to Figure 14 and also to Figures 22 and 23) a valve 197 consisting of a block provided with an opening 198 therein threaded adjacent one end as at 199 to receive a threaded valve stem 200 provided at its inner end with a needle valve 201 cooperating with a reduced portion 202 of the passage 198 and which reduced portion communicates through a duct 203 with a pipe line 204 extending to and communicating with the equalizer tank 177. Communicating with the passage 198 is a duct 205 communicating through a pipe 206 with the atmosphere. The valve block 197 is suitably secured to a bracket 207 secured to a fixed part of the trainer.

The opposite end of the valve stem 200 is provided with an enlarged portion 208 having a small opening 209 therethrough adapted to communicate in one position of rotation, namely, the open position shown in Figure 23, with ports on either side of the valve block 197. One of these ports 210, (see Figures 14 and 22) communicates with the trip bellows of the spin assembly shown in Figure 12 and to be described in detail shortly. The other port 211 communicates with the hose line 180 connected with the main section manifold 37.

The outer extending end of the valve stem 200 carries an arm 212, the upper end of which is provided with a weight 213.

Disposed on either side of this end of the valve 197 are arms 214 of a bracket 215, the upper ends of which arms are provided with adjusting screws 216 in alignment with the arm 212 and against which such arm is adapted to engage.

The normal position of the needle valve 201 is closed and in such position the arm 212 is in the dotted line position shown in Figure 22.

Referring now to Figure 14, it will be noted that connected to the upper end of the arm 193 is one end of a link 217, the opposite end of which is connected as at 218 with the upper end of an arm 219, pivoted at 220. The lower end of the arm 219 has secured thereto one end of a link 221 the opposite end of which is provided with two adjustable pins 222 adapted to be disposed in separated relation at a desired distance with respect to a pin 223 carried upon the valve operating arm 212 and which is disposed between the pins 222.

The connection between the link 217 and the arm 219 is through a sleeve 224 slidable on such link between the coil springs 225 whereby gradual and resilient force is applied to the arm 219.

Again assuming that the trainer is in the climbing position of Figure 15 and remains in such position until such time as the bellows 184, which control the actuation of the air speed indicator, reaches a predetermined position of collapse, due to the operation of the elements previously described, and with the needle valve 189 in substantially closed position with respect to the suction line 185, this corresponding to the stall situation of an aeroplane in actual flight, the link 192 rocks the arm 193 on its pivot 194 causing the link 217 to rock the upper end of the arm 219 to the left in Figure 14 resulting in moving the lower end of the arm 219 to the right and at a predetermined time, governed by the setting of the pins 222 on the link 221, the end pin 222 will engage the pin 223 on the valve control arm 212 causing the same to move to the right in Figures 14 and 22 to gradually open the needle valve 201 to admit atmospheric pressure through the port 205 and hose line 204 to the tank 177. This results in the vertical speed indicator and the altimeter showing descent exactly as it happens in an aeroplane in flight.

When this condition prevails for a predetermined length of time the valve operating arm 212 continues its movement to the right and when it moves past center, the weight 213 on tht upper end thereof causes such arm to quickly drop the rest of the way to the right against the screw stop 216 and in this position the port 209 in the portion 208 of the valve stem registers with the line 211 to the main suction line and also with the line 210 to the trip bellows of the spin assembly, causing the trainer to turn the same as an aeroplane does in a spin.

It will be understood, of course, that during the movement of the needle valve 201 to open position by the movement of the control arm 212 to the right in Figure 22, the opening of the communication between the atmosphere and the tank 177 shows on the vertical speed indicator 68 a steady decrease in rate of climb until it reaches zero and then for a short time a steady increase in rate of descent, this continuing until the valve arm 212 falls over under the influence of the weight 213 to the side open position at which time the needle valve 201 becomes wide open instantly resulting in an immediate and great increase in the rate of descent registration on the vertical speed indicator and similarly, of course, the altimeter records such decrease in altitude showing, duplicating exactly the same conditions in an aeroplane under similar circumstances.

It has been previously stated when an aeroplane stalls, it immediately goes into a spin in which the plane begins to rotate or turn. Means are provided in the trainer for causing the trainer to turn in similar fashion promptly upon the movement of the valve 197 to open position and with the port 209 registering with the lines 210 and 211 shown in Figure 14.

When the valve arm 212 has been moved to the right in Figure 14 a sufficient distance to bring the weight 213 thereof past center and thus causing the valve 197 to rotate to the position shown in full lines in Figure 22, thus opening the communication through the port 209 in the valve 197 to the suction line through the pipe 211, this suction is communicated through the hose line 210 to a bellows 224 (see Figures 12 and 13). Obviously admission of suction to the bellows 224 causes the same to collapse. This bellows is rigidly mounted in any suitable manner upon the shaft 90 and directly between two oppositely disposed bellows 225 and 226. These bellows 225 and 226 have their rigid sides connected together and to the shaft 90 by means of plates 227.

The bellows 224 carries on its movable side a link 228, to the outer end of which is pivotally secured a lever 229 pivotally mounted intermediate its ends as at 230 to one end of a rigid arm 231 secured to the shaft 90. The shaft 90 carries a lock arm 232 rigid therewith and provided at its free end with a notch 233 adapted to receive the free end of the lever 229. Obviously when the lever 229 is in locking position, that is, with the bellows 224 in expanded position, the shaft 90 is locked against turning. If, however, the bellows 224 are collapsed in the manner previously described through the operation of valve 197, the lever 229, rocked on its pivot 230 to the position shown in dotted lines in Figure 13 disengages the locking arm 232 leaving the shaft 90 free to rotate.

Each of the bellows 225 and 226 carries an extending arm 234 pivoted to the ends of which are the links 235, the opposite ends of which are pivotally connected to the arm 232. Obviously therefore, with the locking lever 229 out of engagement with the locking arm 232, the collapsing of either of the bellows 225 or 226 will allow and cause the rotation of the shaft 90, the direction of rotation depending upon which of the bellows is collapsed.

The rotation of the shaft 90 is communicated through the arm 87 and link 91 to the rudder bar 56 causing pivoting of the rudder bar depending upon which of the bellows is collapsed. Obviously the pivoting of the rudder bar 56 results in turning the trainer in the same manner as previously described and through the same elements including the turning motor, as previously explained in connection with the operation of the rudder and rudder bar. This then causes the trainer to simulate an actual aeroplane going into a spin.

Means for collapsing the bellows 225 or 226 comprise a valve 236 (see Figure 12) similar in every respect to valve 197 in that it is provided with a pendulum type operating arm 237 provided with a weight 238 on its ends. The valve is provided with a port 239 which, when the valve is in one angular position, such as for instance, shown in Figures 12 and 24, opens communication through a hose line 240 to the lower bellows 226 and when in the opposite angular position opens communication through hose line 241, to bellows 225. A hose line 242 communicates with the valve 236 and with the suction line 180.

A suitable supporting bracket 243 is provided with arms 244 which serve as stops for the valve arm 237 and between which it swings.

The valve arm 237 is free to swing back and forth between the stops 244 as the trainer tilts from one side to the other. Obviously, the swinging of the arm 237 and the operation of the valve 236 is ineffective to collapse either of the bellows 225 or 226 so long as the locking lever 229 is in engagement with the lock arm 232, the amount of suction force admitted to the bellows being insufficient to overcome this lock. When, however, the trainer has reached the stalling point as previously described, through the prolonged climbing attitude thereof, or through the action of the throttle, to be described, then the operation of the valve 197 results in the unlocking of the bellows 225 and 226 whereupon the trainer is caused to turn in whichever direction the trainer is tilted at the time or was tilted last previous to the unlocking of the spin trip bellows.

Recovery of the trainer from a spin is accomplished in exactly the same manner as a recovery of an aeroplane in actual flight in a spin. The stick is pushed forward, which through the operation of the mechanism previously described, immediately registers on the instruments an increase in air speed and serves to return the valve operating arm 212 to its normal position by means of the inside pin 222 on the link 221. At the same time the pilot in the trainer applies the opposite rudder to the direction of turning through the rudder bar 56, link 91, and arm 87. Also the valve arm 237 with its weight 238 is drawn to the opposite side and against the opposite stop 244 by actuation of the rudder bar through means of an arm 249 (see Figure 5) the end of which is positioned to engage the arm 237 and cause the same to swing in whichever direction the arm 249 is turned by the rudder bar. This immediately causes whichever of the bellows 225 or 226 which has been collapsed to be again expanded so that when the shaft 90 is rotated by operation of the rudder bar to a position shown in Figure 12, the locking lever 229 can again assume its locking position in the notch 233 thereon, the spin trip bellows 224 having been again expanded by the restoration of the valve 197 to normal position.

As is well known, an aeroplane in actual flight responds to the throttle control by showing on the instruments a decrease in air speed or an increase thereof, and of course, depending upon the position of the plane, that is, whether climbing or otherwise. I have provided means in the trainer for simulating exactly the registry of the instruments of an aeroplane under throttle control.

The throttle control means is shown in Figure 14 and in which figure the throttle 70 is shown connected by any suitable flexible connecting means 245 to one end of a lever 246 pivoted at its opposite end 247. Intermediate its ends the lever 246 has connected thereto a link 248, the opposite end of which is connected to the arm 161 at 164, previously described as the pivot point of such arm 161. Obviously, so long as the throttle arm 246 is set in one position, the point 164 on the arm 161 can serve as a pivot or turning point for such arm. However, upon moving the throttle inwardly or outwardly and thus rocking the arm 246 on its pivot, the link 248 serves to rock the arm 161 about its pivot 160 on the stub shaft 159. This movement of the arm 161 in either direction, serves to rock the arm 193 about its pivot 194 and causes the same operations exactly through the links 217 and 192 and the arm 219 and link 221, as previously described. This means that the operation of the throttle to increase or decrease the assumed speed of the motor results in the air speed instrument, the vertical speed instrument, the altimeter, and the stall and spin controlling mechanism, all to register and function in the manner which has been previously described and which simulates exactly the action of a plane in flight.

For instance, in level flight the actuation of the throttle to the increased speed position causes the air speed indicator to show and register an increased speed. Conversely, moving the throttle in the opposite direction results in a registration of loss of speed on that instrument and continued loss of speed will, of course, register on the altimeter as the trainer theoretically loses altitude. Similarly the vertical speed indicator will then show the loss of altitude.

Likewise, if the trainer is in a climbing position and the instruments show a loss of speed to the point of stall, operation of the throttle to theoretically increase the air speed will not only register on the instruments but will prevent the operation of the stall mechanism.

It will thus be seen that I have provided a training device for teaching and practicing flying by instrument in a manner to simulate almost exact conditions of actual flight and without leaving the ground. Of course, changes may be made in details of construction and arrangement of parts without departing from the spirit and scope of my invention. I do not limit myself, therefore, to the exact form herein shown and described other than by the appended claims.

I claim:

1. A trainer comprising a frame, means for rotating said frame around a vertical axis, means for tilting said frame in simulation of an aeroplane in flight, a compass in said frame responsive to the directional positions thereof, and means associated with said compass and operable by the tilting and turning of said frame for deflecting said compass in simulation of the action of a compass in an aeroplane banking and turning in flight.

2. A trainer comprising a frame, means for rotating said frame around a vertical axis, means for tilting said frame in simulation of an aeroplane in flight, a compass in said frame responsive to the directional positions thereof, and means associated with said compass and operable by the tilting and turning of said frame for deflecting said compass in simulation of the action of a compass in an aeroplane banking and turning in flight, said means comprising a magnetic deflector normally disposed for neutral influence on said compass, and movable by tilting of the frame laterally to influence said compass to turn in the direction of and during said tilting.

3. A trainer comprising a frame, means for rotating said frame around a vertical axis, means for tilting said frame in simulation of an aeroplane in flight, a compass in said frame responsive to the directional positions thereof, means associated with said compass and operable by the tilting and turning of said frame for deflecting said compass in simulation of the action of a compass in an aeroplane banking and turning in flight, said means comprising a magnetic deflector normally disposed for neutral influence on said compass, and movable by tilting of the frame laterally to influence said compass to turn in the direction of and during said tilting, and reduced air means for moving said magnetic deflector, actuated by the lateral tilting of said frame.

4. A trainer comprising a frame, means for rotating said frame around a vertical axis, a controlling element for said means, means for tilting said frame laterally, and means independent of said controlling element and operable by tilting said frame for rotating said frame in the direction of and during said tilting.

5. A trainer comprising a frame, means for rotating said frame around a vertical axis, a controlling element for said means, means for tilting said frame laterally, and means independent of said controlling element and operable by tilting said frame for rotating said frame in the direction of and during said tilting, said controlling element being operative to offset said last named means whereby to prevent such rotating.

6. A trainer comprising a frame, means for rotating said frame around a vertical axis, a controlling element for said means, means for tilting said frame laterally, means independent of said controlling element and operable by tilting said frame for rotating said frame in the direction of and during said tilting, said controlling element being operative to offset said last named means whereby to prevent such rotating, and valve operated reduced air means for actuating said rotating and tilting means.

7. A trainer comprising a frame, means for rotating and tilting said frame in simulation of an aeroplane in actual flight, said means comprising a valve operated reduced air motor and bellows operatively connected with said frame, means under the control of a pilot in said frame for actuating said turning and tilting means, and separate means, independent of said control means for actuating said motor and bellows in a predetermined manner to turn and tilt said frame in simulation of "rough air", said separate means comprising a plurality of cam operated valves in the reduced air line of said motor and bellows.

8. A trainer comprising a frame, means for rotating and tilting said frame in simulation of an aeroplane in actual flight, an altimeter in said frame, means connected with said altimeter for causing the same to register in simulation of an aeroplane actually ascending and descending, and means responsive to the tilted ascending and descending positions of said frame for actuating said altimeter operating means.

9. A trainer comprising a frame, means for rotating and tilting said frame in simulation of an aeroplane in actual flight, an altimeter in said frame, means connected with said altimeter for causing the same to register in simulation of an aeroplane actually ascending and descending, and means responsive to the tilted ascending and descending positions of said frame for actuating said altimeter operating means, said actuating means being operable as to the amount and speed of registration in accordance with the length of time and the angle of inclination of said frame.

10. A trainer comprising a frame, means for rotating and tilting said frame in simulation of an aeroplane in actual flight, an air speed indicator in said frame and means for causing said indicator to register air speeds in accordance with the ascending, descending and level flight positions of the frame.

11. A trainer comprising a frame, means for rotating and tilting said frame in simulation of an aeroplane in actual flight, an air speed indicator in said frame, and means for causing said indicator to register air speeds in accordance with the ascending, descending and level flight positions of the frame, said means also being responsive to the length of time the frame is in any position, in exact simulation of the operation of an air speed indicator in actual flight.

12. A trainer comprising a frame, means for rotating and tilting said frame in simulation of an aeroplane in actual flight, an air speed indicator in said frame and means for causing said indicator to register air speeds in accordance with the ascending, descending and level flight positions of the frame, and a throttle control member in said frame, said means being also responsive to said throttle control in exact simulation of the operation of the throttle control in an aeroplane in actual flight.

13. A trainer comprising a frame, means for rotating and tilting said frame in simulation of an aeroplane in actual flight, an air speed indicator in said frame, and air actuated means for causing said indicator to register air speeds, and means operated by the trainer in ascending, descending, and level flight positions thereof for controlling said air actuated means whereby the registrations of said air speed indicator simulate exactly the registrations of such an indicator in actual flight.

14. A trainer comprising a frame, means for rotating and tilting said frame in simulation of an aeroplane in actual flight, an air speed indicator in said frame, and air actuated means for causing said indicator to register air speeds, and means operated by the trainer in ascending, descending and level flight positions thereof for controlling said air actuated means whereby the registrations of said air speed indicator simulate exactly the registrations of such an indicator in actual flight, said air actuated means also being responsive to the length of time the frame is in any position.

15. A grounded trainer comprising a frame, means for rotating and tilting said frame in simulation of an aeroplane in actual flight, an air speed indicator in said frame, means for causing said indicator to register air speeds, and a throttle control member in said frame for operating said means.

16. A grounded trainer comprising a frame, means for rotating and tilting said frame in simulation of an aeroplane in actual flight, an air speed indicator in said frame, means for causing said indicator to register air speeds, a throttle control member in said frame for operating said means, and means connecting said first named means and said frame for actuating said air speed indicator in accordance with the ascending, descending, and level flight positions of said frame.

17. A grounded trainer comprising a frame, means for rotating and tilting said frame in simulation of an aeroplane in actual flight, an air speed indicator in said frame, means for causing said indicator to register air speeds, a throttle control member in said frame for operating said means, and means connecting said first named means and said frame for actuating said air speed indicator in accordance with the ascending, descending, and level flight positions of said frame, said indicator actuating means also being responsive to the length of time the frame is in any position.

18. A grounded trainer comprising a frame, means for rotating and tilting said frame in simulation of an aeroplane in actual flight, an air speed indicator in said frame, air actuated means for causing said indicator to register air speeds, and a throttle control member in said frame for operating said means.

19. A trainer comprising a frame, means for rotating and tilting said frame in simulation of an aeroplane in actual flight, an air speed indicator in said frame, air actuated means for causing said indicator to register air speeds, a throttle control member in said frame for operating said means, and means connecting said first named means and said frame for actuating said air speed indicator in accordance with the ascending, descending and level flight positions of said frame.

20. A trainer comprising a frame, means for rotating and tilting said frame in simulation of an aeroplane in actual flight, an air speed indicator in said frame, air actuated means for causing said indicator to register air speeds, a throttle control member in said frame for operating said means, and means connecting said first named means and said frame for actuating said air speed indicator in accordance with the ascending, descending and level flight positions of said frame, said indicator actuating means also being responsive to the length of time the frame is in any position.

21. A trainer comprising a frame, means for rotating and tilting said frame in simulation of an aeroplane in actual flight, an air speed indicator in said frame, an altimeter in said frame, a throttle control member in said frame, and means for causing said air speed indicator and said altimeter to register in response to the operation of said throttle member.

22. A trainer comprising a frame, means for rotating and tilting said frame in simulation of an aeroplane in actual flight, an air speed indicator in said frame, an altimeter in said frame, a throttle control member in said frame, and means for causing said air speed indicator and said altimeter to register in response to the operation of said throttle member and also in response to the ascending, descending and level flight positions of said frame.

23. A trainer comprising a frame, means for rotating and tilting said frame in simulation of an aeroplane in actual flight, a vertical speed indicator in said frame, and means for causing said vertical speed indicator to register in accordance with the ascending, descending, and level flight positions of said frame.

24. A trainer comprising a frame, means for rotating and tilting said frame in simulation of an aeroplane in actual flight, a vertical speed indicator in said frame, and means for causing said vertical speed indicator to register in accordance with the ascending, descending, and level flight positions of said frame, said means also being responsive to the length of time of the frame in any position.

25. A trainer comprising a frame, means for rotating and tilting said frame in simulation of an aeroplane in actual flight, a vertical speed indicator in said frame, means for causing said vertical speed indicator to register in accordance with the ascending, descending and level flight positions of said frame, said means also being responsive to the length of time of the frame in any position, a throttle control member in said frame, and means for causing said vertical speed indicator to register in accordance with the actuation of said throttle control member.

26. A grounded trainer comprising a frame, means for rotating and tilting said frame in simulation of an aeroplane in actual flight, a vertical speed indicator in said frame, and air actuated means for causing said vertical speed indicator to register in accordance with the ascending, descending and level flight positions of said frame.

27. A grounded trainer comprising a frame, means for rotating and tilting said frame in simulation of an aeroplane in actual flight, a vertical speed indicator in said frame, and air actuated means for causing said vertical speed indicator to register in accordance with the ascending, descending and level flight positions of said frame, said means also being responsive to the length of time of the frame in any position.

28. A trainer comprising a frame, means for rotating and tilting said frame in simulation of an aeroplane in actual flight, a vertical speed indicator in said frame, air actuated means for causing said vertical speed indicator to register in accordance with the ascending, descending and level flight positions of said frame, said means also being responsive to the length of time of the frame in any position, a throttle control member in said frame, and means for causing said vertical speed indicator to register in accordance with the actuation of said throttle control member.

29. A trainer comprising a frame, means for rotating and tilting said frame, in simulation of an aeroplane in actual flight, an altimeter, an air speed indicator and a vertical speed indicator all mounted in said frame, and means for actuating said instruments to register in accordance with the ascending, descending and level flight positions of said frame.

30. A trainer comprising a frame, means for rotating and tilting said frame in simulation of an aeroplane in actual flight, an altimeter, an air speed indicator and a vertical speed indicator all mounted in said frame, means for actuating said instruments to register in accordance with the ascending, descending and level flight positions of said frame, a throttle control member in said frame, and means controlled thereby for operating said instrument actuating means.

31. A trainer comprising a frame, means for rotating and tilting said frame in simulation of an aeroplane in actual flight, an altimeter, an air speed indicator and a vertical speed indicator all mounted in said frame, means for actuating said instruments to register in accordance with the ascending, descending and level flight positions of said frame, a throttle control member in said frame, and means controlled thereby for operating said instrument actuating means, the registration of said instruments also being influenced by the length of time of said frame in any position.

32. A grounded trainer comprising a frame, means for rotating and tilting said frame in simulation of an aeroplane in actual flight, an altimeter, an air speed indicator and a vertical speed indicator all mounted in said frame, and air actuated means for causing said instruments to register in accordance with the ascending, descending and level flight positions of said frame.

33. A trainer comprising a frame, means for rotating and tilting said frame in simulation of an aeroplane in actual flight, an altimeter, an air speed indicator and a vertical speed indicator all mounted in said frame, air actuated means for causing said instruments to register in accordance with the ascending, descending and level flight positions of said frame, a throttle control member in said frame, and means controlled thereby for operating said instrument actuating means.

34. A trainer comprising a frame, means for rotating and tilting said frame in simulation of an aeroplane in actual flight, an altimeter, an air speed indicator and a vertical speed indicator all mounted in said frame, air actuated means for causing said instruments to register in accordance with the ascending, descending and level flight positions of said frame, a throttle control member in said frame, and means controlled thereby for operating said instrument actuating means, the registration of said instruments also being influenced by the length of time of said frame in any position.

35. A trainer comprising a frame, means for rotating and tilting said frame in simulation of an aeroplane in actual flight, and means independent of said first named means for causing said frame to tilt to a descending position and turn after a predetermined length of time in an ascending position.

36. A trainer comprising a frame, means for rotating and tilting said frame in simulation of an aeroplane in actual flight, means independent of said first named means for causing said frame to tilt to a descending position and turn after a predetermined length of time in an ascending position, and means for restoring said frame to the control of said first named means.

EDWIN A. LINK, Jr.